United States Patent
Tabirian et al.

(10) Patent No.: US 10,107,945 B2
(45) Date of Patent: Oct. 23, 2018

(54) VECTOR VORTEX WAVEPLATES

(71) Applicant: BEAM Engineering for Advanced Measurements Co., Orlando, FL (US)

(72) Inventors: Nelson Tabirian, Winter Park, FL (US); Sarik Nersisyan, Oviedo, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 214 days.

(21) Appl. No.: 14/193,027

(22) Filed: Feb. 28, 2014

(65) Prior Publication Data
US 2017/0010397 A1    Jan. 12, 2017
US 2018/0003874 A9    Jan. 4, 2018

Related U.S. Application Data

(60) Provisional application No. 61/771,592, filed on Mar. 1, 2013.

(51) Int. Cl.
*G02B 5/30* (2006.01)
*B05D 5/06* (2006.01)
*B05D 3/06* (2006.01)

(52) U.S. Cl.
CPC ........... *G02B 5/3016* (2013.01); *B05D 3/06* (2013.01); *B05D 5/06* (2013.01)

(58) Field of Classification Search
CPC .................................................. G02B 5/3016
USPC .................................................. 427/162–169
See application file for complete search history.

(56) References Cited

U.S. PATENT DOCUMENTS

| | | |
|---|---|---|
| 2,435,616 A | 2/1948 | Vittum |
| 3,721,486 A | 3/1973 | Bramley |
| 3,897,136 A | 7/1975 | Bryngdahl |
| 4,160,598 A | 7/1979 | Firester et al. |
| 4,301,023 A | 11/1981 | Schuberth |

(Continued)

FOREIGN PATENT DOCUMENTS

| | | |
|---|---|---|
| EP | 1970734 | 9/2008 |
| EP | 2088456 | 8/2009 |

(Continued)

OTHER PUBLICATIONS

Tabiryan et al; Fabricating Vector Vortex Waveplates for Coronagraphy; Aerospace Conference, 2012 IEEE; publicly available Apr. 19, 2012; pp. 1-12.*

(Continued)

*Primary Examiner* — Elizabeth A Burkhart
(74) *Attorney, Agent, or Firm* — Brian S. Steinberger; Law Offices of Brian S. Steinberger, P.A.

(57) ABSTRACT

Method for fabrication of vector vortex waveplates of improved quality due to reduced singularity size and widened spectral band, the method comprising creating a boundary condition for vortex orientation pattern of a liquid crystal polymer on a substrate using materials with reversible photoalignment, equalizing exposure energy over the area of the waveplate by redistributing the energy of radiation used for photoalignment from the center of the beam to its peripheries, and using vector vortex waveplate as a linear-to-axial polarization converter. Fabrication of spectrally broadband vector vortex waveplates further comprises two or more liquid crystal polymer layers with opposite sign of twist.

7 Claims, 4 Drawing Sheets

(56) References Cited

U.S. PATENT DOCUMENTS

| | | |
|---|---|---|
| 4,698,816 A | 10/1987 | Chun |
| 4,956,141 A | 9/1990 | Allen |
| 4,983,332 A | 1/1991 | Hahn |
| 5,032,009 A | 7/1991 | Gibbons |
| 5,042,950 A | 8/1991 | Salmon, Jr. |
| 5,047,847 A | 9/1991 | Toda |
| 5,100,231 A | 3/1992 | Sasnett et al. |
| 5,142,411 A | 8/1992 | Fiala |
| 5,150,234 A | 9/1992 | Takahashi |
| 5,218,610 A | 6/1993 | Dixon |
| 5,325,218 A | 6/1994 | Willett |
| 5,446,596 A | 8/1995 | Mostrorocco |
| 5,619,325 A | 4/1997 | Yoshida |
| 5,621,525 A | 4/1997 | Vogeler et al. |
| 5,712,721 A | 1/1998 | Large |
| 5,895,422 A | 4/1999 | Hauber |
| 5,903,330 A | 5/1999 | Funschilling |
| 5,989,758 A | 11/1999 | Komatsu |
| 6,091,471 A | 7/2000 | Kim |
| 6,107,617 A | 8/2000 | Love et al. |
| 6,139,147 A | 10/2000 | Zhang |
| 6,170,952 B1 | 1/2001 | La Haye et al. |
| 6,191,880 B1 | 2/2001 | Schuster |
| 6,219,185 B1 | 4/2001 | Hyde |
| 6,320,663 B1 | 11/2001 | Ershov |
| 6,373,549 B1 | 4/2002 | Tombling et al. |
| 6,452,145 B1 | 9/2002 | Graves et al. |
| 6,551,531 B1 | 4/2003 | Ford |
| 6,678,042 B2 | 1/2004 | Tabirian et al. |
| 6,728,049 B1 | 4/2004 | Tabirian et al. |
| 6,792,028 B2 | 9/2004 | Cook |
| 6,911,637 B1 | 6/2005 | Vorontsov et al. |
| 7,048,619 B2 | 5/2006 | Park |
| 7,094,304 B2 | 8/2006 | Nystrom |
| 7,095,772 B1 | 8/2006 | Delfyett et al. |
| 7,196,758 B2 | 3/2007 | Crawford |
| 7,319,566 B2 | 1/2008 | Prince |
| 7,324,286 B1 | 1/2008 | Glebov |
| 7,450,213 B2 | 11/2008 | Kim et al. |
| 7,764,426 B2 | 7/2010 | Lipson et al. |
| 8,045,130 B2 | 10/2011 | Son |
| 8,077,388 B2 | 12/2011 | Gerton et al. |
| 8,264,623 B2 | 11/2012 | Marrucci |
| 8,520,170 B2 | 8/2013 | Escuti |
| 8,582,094 B1 | 11/2013 | Shortt |
| 8,643,822 B2 | 2/2014 | Tan et al. |
| 8,937,701 B2 | 1/2015 | Rossini |
| 8,982,313 B2 | 3/2015 | Escuti et al. |
| 9,541,772 B2 | 1/2017 | De Sio et al. |
| 9,557,456 B2 | 1/2017 | Tabirian et al. |
| 9,592,116 B2 | 3/2017 | De Sio et al. |
| 9,617,205 B2 | 4/2017 | Tabirian et al. |
| 9,658,512 B2 | 5/2017 | Tabirian et al. |
| 9,715,048 B2 | 7/2017 | Tabirian et al. |
| 9,753,193 B2 | 9/2017 | Tabirian et al. |
| 9,976,911 B1 | 5/2018 | Tabirian et al. |
| 9,983,479 B2 | 5/2018 | Tabirian et al. |
| 10,031,424 B2 | 7/2018 | Tabirian et al. |
| 10,036,886 B2 | 7/2018 | Tabirian et al. |
| 2001/0002895 A1 | 6/2001 | Kawano |
| 2001/0018612 A1 | 8/2001 | Carson et al. |
| 2001/0030720 A1 | 10/2001 | Ichihashi |
| 2002/0027624 A1 | 3/2002 | Seiberle |
| 2002/0097361 A1 | 7/2002 | Ham |
| 2002/0167639 A1 | 11/2002 | Coates |
| 2003/0021526 A1 | 1/2003 | Bouevitch |
| 2003/0072896 A1 | 4/2003 | Kwok |
| 2003/0137620 A1 | 7/2003 | Wang |
| 2003/0152712 A1 | 8/2003 | Motomura |
| 2003/0206288 A1 | 11/2003 | Tabirian et al. |
| 2003/0214700 A1 | 11/2003 | Sidorin |
| 2003/0218801 A1 | 11/2003 | Korniski et al. |
| 2004/0051846 A1 | 3/2004 | Blum et al. |
| 2004/0105059 A1 | 6/2004 | Ohyama |
| 2004/0165126 A1 | 8/2004 | Ooi et al. |
| 2005/0030457 A1 | 2/2005 | Kuan et al. |
| 2005/0110942 A1 | 5/2005 | Ide |
| 2005/0219696 A1 | 10/2005 | Albert et al. |
| 2005/0271325 A1 | 12/2005 | Anderson et al. |
| 2005/0280717 A1 | 12/2005 | Chen |
| 2006/0008649 A1 | 1/2006 | Shinichiro |
| 2006/0055883 A1 | 3/2006 | Morris et al. |
| 2006/0109532 A1 | 5/2006 | Savas |
| 2006/0221449 A1 | 10/2006 | Glebov et al. |
| 2006/0222783 A1 | 10/2006 | Hayashi |
| 2007/0032866 A1 | 2/2007 | Portney |
| 2007/0040469 A1 | 2/2007 | Yacoubian |
| 2007/0115551 A1 | 5/2007 | Spilman et al. |
| 2007/0122573 A1 | 5/2007 | Yasuike |
| 2007/0132930 A1 | 6/2007 | Ryu et al. |
| 2007/0247586 A1 | 10/2007 | Tabirian |
| 2007/0258677 A1 | 11/2007 | Chigrinov |
| 2008/0226844 A1* | 9/2008 | Shemo ............... G02B 5/3016 428/1.1 |
| 2008/0278675 A1 | 11/2008 | Escuti |
| 2009/0002588 A1 | 1/2009 | Lee et al. |
| 2009/0052838 A1 | 2/2009 | McDowall |
| 2009/0073331 A1 | 3/2009 | Shi |
| 2009/0122402 A1 | 5/2009 | Shemo et al. |
| 2009/0141216 A1 | 6/2009 | Marrucci |
| 2009/0201572 A1 | 8/2009 | Yonak |
| 2009/0256977 A1 | 10/2009 | Haddock |
| 2009/0257106 A1 | 10/2009 | Tan |
| 2009/0264707 A1 | 10/2009 | Hendricks |
| 2010/0003605 A1 | 1/2010 | Gil |
| 2010/0066929 A1 | 3/2010 | Shemo |
| 2011/0069377 A1 | 3/2011 | Wu et al. |
| 2011/0075073 A1 | 3/2011 | Oiwa |
| 2011/0085117 A1 | 4/2011 | Moon et al. |
| 2011/0097557 A1 | 4/2011 | May |
| 2011/0109874 A1 | 5/2011 | Piers et al. |
| 2011/0135850 A1 | 6/2011 | Saha et al. |
| 2011/0188120 A1 | 8/2011 | Tabirian et al. |
| 2011/0234944 A1 | 9/2011 | Powers |
| 2011/0262844 A1* | 10/2011 | Tabirian ............... G02B 5/3083 430/2 |
| 2012/0140167 A1 | 6/2012 | Blum |
| 2012/0162433 A1 | 6/2012 | Fuentes Gonzalez |
| 2012/0188467 A1 | 7/2012 | Escuti |
| 2013/0027656 A1* | 1/2013 | Escuti ................. G02B 5/3083 349/193 |
| 2013/0057814 A1 | 3/2013 | Prushinskiy et al. |
| 2013/0072915 A1 | 3/2013 | Grant |
| 2013/0202246 A1 | 8/2013 | Meade |
| 2013/0205367 A1 | 8/2013 | Sambamurthy |
| 2014/0055740 A1 | 2/2014 | Spaulding |
| 2014/0211145 A1 | 7/2014 | Tabirian |
| 2014/0252666 A1 | 9/2014 | Tabirian |
| 2015/0049487 A1 | 2/2015 | Connor |
| 2015/0081016 A1 | 3/2015 | De Sio et al. |
| 2015/0276997 A1 | 10/2015 | Tabirian et al. |
| 2016/0023993 A1 | 1/2016 | Tabirian |
| 2016/0047955 A1 | 2/2016 | Tabirian et al. |
| 2016/0047956 A1 | 2/2016 | Tabirian et al. |
| 2016/0209560 A1 | 7/2016 | Tabirian et al. |
| 2016/0363484 A1 | 12/2016 | Barak et al. |
| 2016/0363783 A1 | 12/2016 | Blum |
| 2017/0010397 A1 | 1/2017 | Tabirian et al. |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |
| WO | 2014064679 | 5/2014 |

OTHER PUBLICATIONS

U.S. Appl. No. 12/662,525, filed Apr. 2010, Tabirian et al.

Tabiryan, et al., Broadband waveplate lenses, Optics Express 7091, (56) References Cited

OTHER PUBLICATIONS vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering for Advanced Measurements Co., PCT Application No. PCT/US2015026186, The Extended European Search Report, filed on Mar. 8, 2017, 13 pages.
Blinov, et al., Electrooptic Effects in Liquid Crystal MAterials, Springer-Verlag New York, 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microorubbing, Japanese Journal of Applied Phsyics, vol. 44, No. 1A, 2005, 4 pages.
Tabirian, N., et al., U.S. Appl. No. 61/757,259, filed Jan. 28, 2013, 29 pages.
Tabiryan, et al., The Promise of Diffractive Waveplates, OPN Optics and Photonics News, Mar. 2010, 6 pages.
Tabirian, N., Utility U.S. Appl. No. 15/189,551, filed Jun. 22, 2016, Office Action Summary dated Feb. 27, 2018, 16 pages.
Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.
Nersisyan, et al., Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Nersisyan, et al., Fabrication of Liquid Crystal Polymer Axial Waveplates for UV-IR Wavelengths, Optics Express, vol. 17, No. 14, Jul. 2009, 9 pages.
Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.
Nersisyan, et al., Polarization insensitive imaging through polarization gratings, Optics Express, vol. 17, No. 3, Feb. 2, 2009, 14 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst, vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching Between Diffraction Orders in Transverse-Periodically Aligned Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt, et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 1996, 4 pages.

Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al, Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1197, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Stalder, et al., Linerally polarized light with axial symmetry generated by liquid-crystal polarization converters, Optics Letters vol. 21, No. 1996, 3 pages.
Kakichashvili, et al., Method for phase polarization recording of holograms, Sov. J. Quantum. Electron, vol. 4, No. 6, Dec. 1974, 5 pages.

(56) References Cited

OTHER PUBLICATIONS

Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.
Pagliusi et al. Surface-induced photorefractivity in twistable nematics: toward the all-optical control of gain, Opt. Expr. vol. 16, Oct. 2008, 9 pages.
M. Honma, T. Nose, Polarization-independent liquid crystal grating fabricated by microrubbing process, Jpn. J. Appl. Phys., Part 1, vol. 42, 2003, 3 pages.
Anderson, G., et al., Broadband Antihole Photon Sieve Telescope, Applied Optics, vol. 16, No. 18., Jun. 2007, 3 pages.
Early, J. et al., Twenty Meter Space Telescope Based on Diffractive Fresnel Lens, SPIE, U.S. Department of Energy, Lawrence Livermore National Laboratory, Jun. 2003, 11 pages.
Martinez-Cuenca, et al., Reconfigurable Shack-Hartmann Sensor Without Moving Elements,Optical Society of America, vol. 35, No. 9, May 2010, 3 pages.
Serak, S., et al., High-efficiency 1.5 mm Thick Optical Axis Grating and its Use for Laser Beam Combining, Optical Society of America, vol. 32, No., Jan. 2007, 4 pages.
Ono et al., Effects of phase shift between two photoalignment substances on diffration properties in liquid crystalline grating cells, Appl. Opt. vol. 48, Jan. 2009, 7 pgs.
Naydenova et al., "Diffraction form polarization holographic gratings with surface relief in side chain azobenzene polyesters" J. Opt. Soc. Am. B, vol. 15, (1998), 14 pages.
Oh et al., Achromatic polarization gratings as highly efficent thin-film polarizing beamsplitters for broadband light Proc. SPIE vol. 6682, (2007), 4 pages.
Nersisyan, S., et al., Polarization insensitive imaging through polarization gratins, Optics Express, vol. 17, No. 3, Feb. 2, 2009, 14 pages.
Oise, Optics in the Southeast, Technical Conference and Tabletop Exhibit, Optical Society of America, Orlando, FL., Nov. 12-13, 2003, 9 pages.
Dierking, Polymer Network-Stabilized Liquid Crystals, Advanced Materials, vol. 12, No. 3, 2000, 15 pages.
Pepper, M. et al, Nonlinear Optical Phase Conjugation, IEEE, Sep. 1991, pp. 21-34, 14 pages.
Tabirian, N., Utility U.S. Appl. No. 14/194,808, filed Mar. 2, 2014, Office Action Summary dated Feb. 9, 2018, 10 pages.
Tabirian, N., Utility U.S. Appl. No. 14/324,126, filed Jul. 4, 2014, Office Action Summary dated Feb. 8, 2018, 13 pages.
De Sio, L., et al., "Digital Polarization Holography Advancing Geometrical Phase Optics," 2016, Optics Express, vol. 24, Issue 16, pp. 18297-18306, 10 pages.
Borek, G. and D. Brown, "High-performance diffractive optics for beam shaping," 1999, Proceeding of SPIE, vol. 3633, pp. 51-60, 10 pages.
Gerchberg, et al, practical algorithm for the determination of the phase from image and diffraction plane pictures, 1972, Optik, vol. 35, Issue 2, pp. 237-246, 10 pages.
Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.
Marrucci, et al., Pancharatnam-Berry phase optical elements for wave front shaping in the visible domain, Appl. Phys. Lett. 88, 2006, 3 pages.
Sobolewska et al., "On the inscription of period and half period surface relief gratings in azobenzene-functionalized polymers", J. Phys. Chem., vol. 112 (15) Jan. 3, 2008, 10 pages.
Barrett et al., Model of laser driven mass transport in thin films of dye-functionalized polymers, J. Chem. Phys., vol. 109 (4), Jul. 22, 1998, 13 pages.
Tabirian, U.S. Appl. No. 14/214,375, filed Mar. 14, 2014, Office Action Summary dated Jun. 27, 2017, 10 pages.
Tabirian, et al., U.S. Appl. No. 14/688,425, filed Apr. 16, 2015, Office Action Summary dated Oct. 5, 2017, 10 pages.
Serak, et al. Diffractive Waveplate Arrays [Invited], Journal of the Optical Society of America B, May 2017, pp. B56-B63, vol. 34, No. 5, 8 pages.
Emoto, Optical and Physical Applications of Photocontrollable Materials: Azobenzene-Containing and Liquid Crystalline Polymers, Polymers,Jan. 2012, 150-186, vol. 4, 38 pages.
Tabirian, et al., U.S. Appl. No. 14/688,197, filed Apr. 16, 2015, Office Action Summary dated Aug. 6, 2018, 19 pages.
Tabirian, et al., U.S. Appl. No. 15/621,553, filed Jun. 13, 2017, Office Action Summary dated Aug. 7, 2018, 11 pages.

\* cited by examiner

VECTOR VORTEX WAVEPLATES

RELATED APPLICATIONS

This application claims the benefit of priority to U.S. Provisional Application No. 61/771,592 filed Mar. 1, 2013, the contents of which are relied upon in its' entirety herein.

FIELD OF THE INVENTION

This invention relates to fabrication of liquid crystal polymer vector vortex waveplates (VVWs) with improved optical properties due to decreased defect size, widened spectral bandwidth, and large area. VVWs are used in astronomy, imaging, optical communication, photonics and display technologies.

BACKGROUND OF THE INVENTION

The challenge in imaging faint objects near bright stars is in reducing the starlight and the noise by many orders of magnitude while efficiently transmitting the planet light. Due to scattered starlight, the planets near bright stars could be observed earlier only at large angular separations and with large telescopes. Using a small aperture telescope system for detecting exoplanets at nearly diffraction limit of their separation from the star can have a significant impact on astronomy as well as other imaging and space communication systems. Vector vortex coronagraphs prove to provide such an opportunity. When used with larger aperture telescopes, a vortex coronagraph would allow detecting planets even closer to the stars, hence brighter and in early stages of formation.

In this new generation of smaller, lighter and more affordable coronagraph systems, the star light is rejected with the aid of phase-based transparent "masks" capable of transmitting planetary light at small angular separation from the star. These so-called vortex vector waveplates (VVW) are complex optical components wherein the optical axis orientation is rotating in space in an axially symmetric manner. Liquid crystals (LCs), particularly, LC polymers (LCPs) are the only material systems that allow fabrication of VVWs with continuous rotation of the optical axis orientation at a high spatial frequency required for obtaining a high topological charge and high contrast. LCs are transparent in visible, near IR and even for longer wavelengths and, due to their high optical anisotropy, the half-wave phase retardation condition is achieved in thin material layers (~1 micrometer).

Thus, there is a need for a technique that would allow fabricating large diameter VVWs with small singularity size, and broadband at different spectral ranges, including visible and infrared. Particularly important is reducing the defect size to subwavelength sizes.

BRIEF SUMMARY OF THE INVENTION

The objective of the present invention is providing LCP VVWs with improved optical properties due to defect size reduced to micrometers and wide spectral range of operation, said improvements achieved by using materials with reversible photoalignment, redistributing light energy from the axis of the beam to its peripheries, and combining multiple LCP layers into a single WW.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1A:
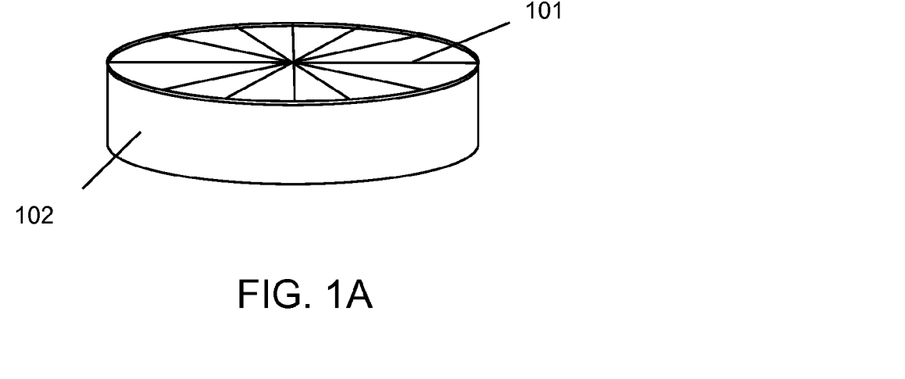
FIG. 1A schematically shows a VVW with radially aligned optical axis orientation deposited on a substrate.
Figure 1B:
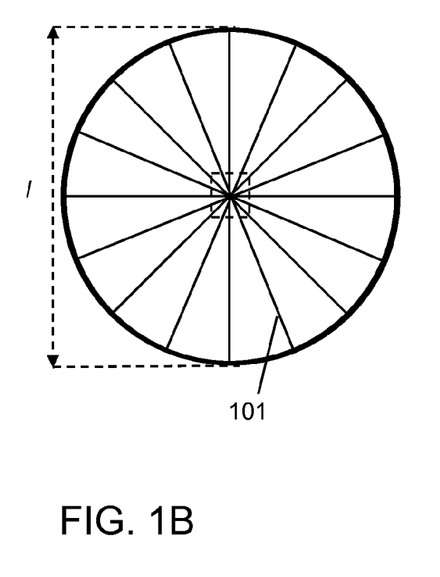
FIG. 1B schematically shows radial alignment of optical axis orientation in VVW.
Figure 1C:
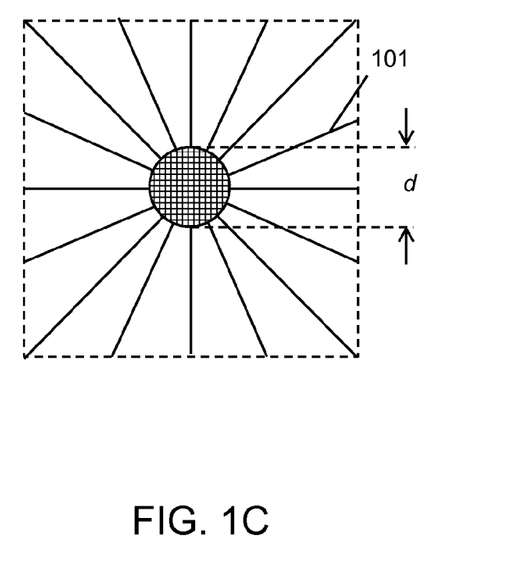
FIG. 1C schematically shows the defect area at the axis of a VVW.

An example of a VVW is shown in FIG. 1A. It comprises a substrate 102 and the LCP layer 101 deposited on said substrate. The optical axis orientation in this example of a preferred embodiment is radially aligned as shown in FIG. 1B. The optical axis orientation is not well defined in the center of a VVW. Typically, a defect of not oriented LCP is present within the axial region of an average size indicated as d in FIG. 1C. Defect sizes as large as d~100 micrometer were known in the earlier art. Even if the diameter of the VVW indicated as I in FIG. 1B may be much larger than the defect size d, light scattering in this region may make the functionality of the VVW inadequate, particularly, for demanding astronomy, optical communications and high energy laser applications.

Figure 2:
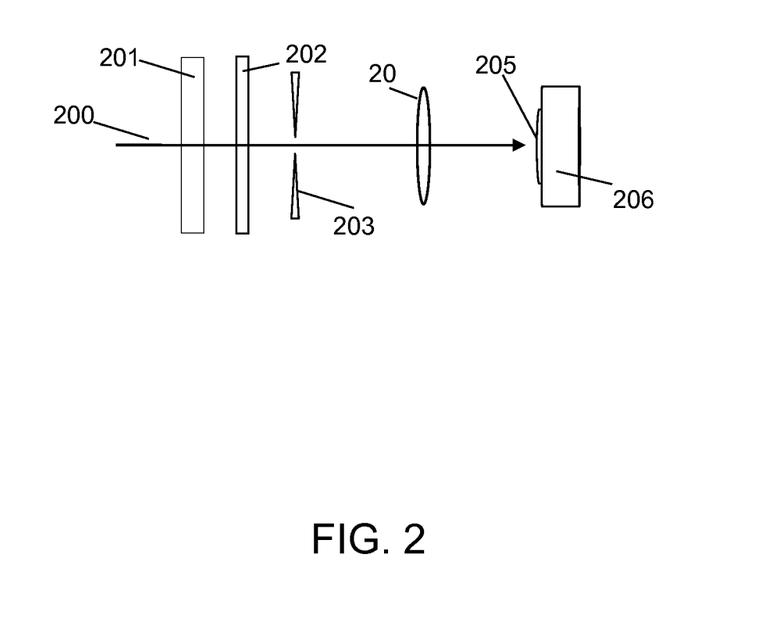
FIG. 2 schematically shows the setup for fabricating a VVW with light intensity redistribution.

The preferred embodiment of the setup for fabricating large area VVWs with reduced defect size, FIG. 2, comprises a substrate 206 chosen for high transparency in desired wavelength range that may including visible and infrared. The substrate is coated with a photoalignment layer 205. In the preferred embodiment of the present invention the photoalignment layer comprises an azobenzene dye based on chromocentranine R structures. An example of such a dye is sulfonic bisazodye SD1:

Typically, azobenzene dyes are in the form of a powder at room temperature, and they can be used for coating by dissolving them in a variety of solvents, including water. The film thickness is determined by the concentration of the azo dye in the solvent and the coating technique. Variety of coating techniques are applicable, including dip coating, printing, stamping, and spin coating. In the latter case, approximately 1 wt. % of said azo dye can be used in a DMF as solvent. Spinning at 3000 rpm for 60 s provides thus a photoalignment layer of a few tens of nm thickness.

The photoalignment layer 205 is coated on a substrate 206 that is chemically resistive to the solvents used in the process (glass, for example). The photoalignment layer 205 is exposed to a polarized light comprising a wavelength in the absorption band of said photoalignment material. Said absorption band can be in the UV or visible part of the spectrum. The exposure dose depends on the specific azobenzene photoalignment material and the radiation wavelength. PAAD-72 (available at www.beamco.com), for example, produces high quality alignment conditions for Merck's RMS series reactive mesogens within 5 min exposure time to a UV radiation of 325 nm wavelength and 10 mW/cm$^2$ power density.

In the preferred embodiment of the photoalignment setup shown in FIG. 2, UV radiation 200 (325 nm wavelength, as an example) is expanded to uniformly cover the whole area coated by the photoalignment layer. Radiation intensity can be approximately 10 mW/cm$^2$ for the photoalignment materials used in the preferred embodiment. A linear aperture 203 selects then a linear beam stripe, which is focused onto the photoalignment layer 205 by a cylindrical lens 204. Thus, a linear beam of a micrometer width can be obtained. A linear polarizer 202 is then used for setting the polarization of the laser beam along (or perpendicular to) the transmitted beam stripe in order to obtain radial (or azimuthal) alignment boundary conditions in the photoalignment layer.

The substrate 206 carrying the photoalignment layer 205 is attached to a high precision rotational stage such as the rotation axis is aligned with the central part of the beam stripe. The optimum values of the rotation speed and duration are determined experimentally for given exposure conditions and the photoalignment layer. For example, rotation speed 250°/s and duration~30 min may be used for the azobenzene photoalignment materials subject to 10 mW/cm$^2$ beam intensity. Note that the exposure time for producing orientation patterns modulated at high spatial frequencies need to be longer than the time required for uniform alignment since longer exposure typically results in stronger surface alignment energy.

For recording VVWs of higher topological charge, the polarizer may be rotated as well synchronized with the rotation of the substrate.

Light energy received by the central part of the substrate is higher than at the periphery by a factor $\sim \pi/\text{ld} \gg 1$, where d is the beam size and l is the size of the waveplate under fabrication. Thus, the dose of energy received by the peripheral areas is orders of magnitude smaller compared to that of the central area. As a result, if the exposure is sufficient for obtaining good photoalignment at the periphery of the layer, the central part becomes highly overexposed degrading the alignment in a large area around the rotation axis. Thus, reducing the exposure energy density results in smaller defect sizes, but at the expense of degraded alignment in the underexposed periphery. Reducing the exposure energy by a factor of nearly 20, for example, by reducing the light intensity from 10 mW/cm$^2$ to 0.6 mW/cm$^2$, may result in a factor of 4-6 decrease in defect size, from 20 μm to ~5 μm for VVWs within a given setup and materials. However, the overall diameter of the WW with good alignment quality may be reduced then by a similar factor, i.e., from 20 mm to ~4 mm.

To obtain a VVW with both a small central defect and a large overall diameter, the entire substrate must receive comparable net exposure energy. Variable density optical filters such as bullseye filters are hard to customize for producing the strong attenuation gradients required for light redistribution, and they achieve such a redistribution by absorbing or reflecting light, hence causing overall attenuation of light energy. Such variable density filters thus reduce the efficiency of the photoalignment process.

In the preferred embodiment, redistribution of the illumination from the vicinity of the beam's axis to its peripheries is accomplished by making use of a VVW 201 as such a waveplate produces a doughnut beam by itself. To efficiently redistribute the light energy from the center of the beam to its peripheries, a radial VVW designed for the wavelength of the photoaligning radiation, 325 nm wavelength, for example, can be used.

Figure 3:
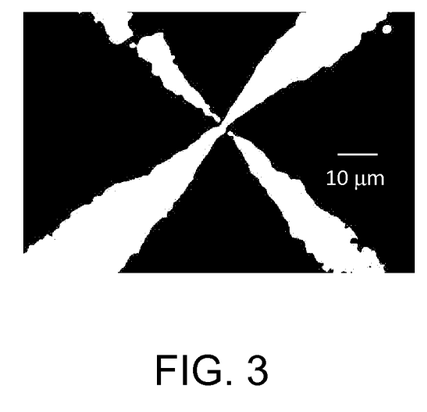
FIG. 3 shows a polarizing microscopy photo of a WW with 3 micrometer defect size.

The photoalignment process can be reduced to 5-7 min when using VVW for beam energy redistribution due to full utilization of all the available light. Precise setting of the half-wave retardation condition at 325 nm wavelength is essential for efficient reshaping of the beam. The obtained VVW with reduced defect size can further be used as a beam shaping element to fabricate VVWs with further reduced defect size. Such consecutive improvements allow obtaining a high quality, large area (~1") VVWs with defect sizes less than 5 μm. Combined with fine adjustment of the position of the beam shaping VVW with respect to the beam axis, this approach ultimately can yield VVWs with defect sizes of <5 μm when using, for example, a cylindrical lens of 75 mm focal length, and below 3 μm for a lens of 25 mm focal length as shown in FIG. 3. The actual photo is reduced to black and white with 100% contrast to avoid grey scale in FIG. 3.

In the final stage of fabrication, polymerizable liquid crystal (PLC) is spin coated on a substrate photoaligned in a rotation process and polymerized in unpolarized UV light (for example, of 365 nm wavelength and 10 mW/cm$^2$ power density) for 5 min in nitrogen atmosphere. Subsequent PLC layers can be deposited for adjusting the half-wave retardation condition.

The principle of fabrication of a broadband VVW of the present invention consists in combining VVWs twisted along their layer thickness at opposite signs. The twist can be obtained, for example, by doping the polymerizable liquid crystals with chiral molecules of opposite sign of chirality. Half-wave retardation condition shall be maintained for each type of the set of layers around the wavelength in the middle of the desired spectral bandwidth.

Chiral polymerizable liquid crystals can be obtained, for example, by doping PLC RMS03-001c with chiral dopants CB15 and ZLI 811 (both from Merck). CB15 and ZLI 811 are characterized by so-called helical twisting power (HTP) equal to 7.3 μm$^{-1}$ (right-handed) and −11 μm$^{-1}$ (left-handed), correspondingly. HTP determines the pitch h of a LC as a function of dopant concentration, HTP=(hc)$^{-1}$, where c is the dopant concentration normalized to the concentration of the molecules in the material. Small concentrations of dopants can be used, 0.34% for CB 15 and 0.25% for ZLI 811.

The deposition conditions for the right- and left-twisted layers can be similar. For example, the 1$^{st}$ and the 2$^{nd}$ layers (0.34 wt. % CB15) are spin coated at 6500 and 2000 rpm, respectively. The 3$^{rd}$ and 4$^{th}$ layers (0.25% ZLI 811) are spin coated at 2000 and 6500 rpm, respectively. A broadband VVW thus fabricated can exhibit over 300 nm diffraction bandgap around 700 nm wavelength. 200 nm bandgap around 550 nm wavelength is obtained for thicker 1$^{st}$ and the 4$^{th}$ layers coated at 3000 rpm. The measured defect size was 12-15 μm for the broadband IR VVW and 5 μm for the broadband visible WW.

Figure 4:
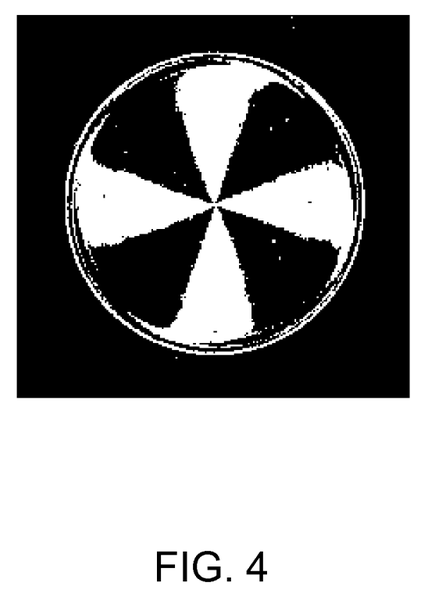
FIG. 4 shows a photos of WW achromatic in visible spectral range VVW (450-650 nm). Photos are taken between crossed polarizers.
Figure 5:
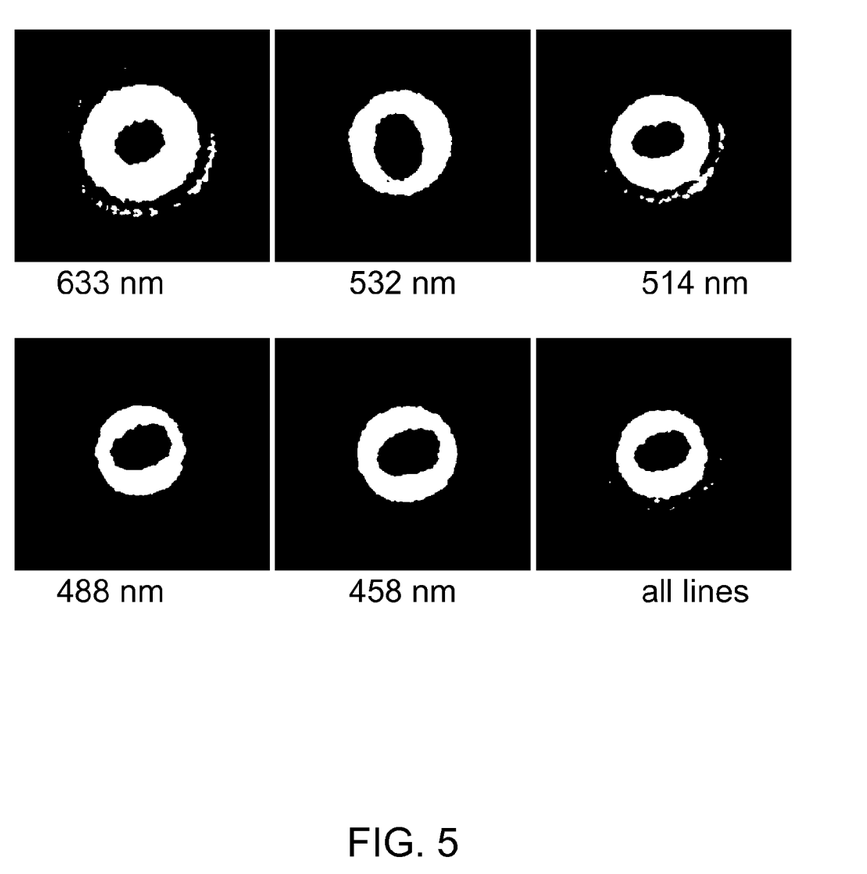
FIG. 5 shows photos of doughnut beams of different wavelengths produced by an achromatic WW. Photos were taken for Ar+ laser lines (458 nm, 488 nm, 514 nm), for a diode pumped solid state laser (532 nm), and a He—Ne (633 nm) laser beam.

FIG. 4 shows a photo of VVW between crossed polarizers achromatic in visible spectral range VVW (450-650 nm). The actual photo is reduced to black and white with 100% contrast to avoid grey scale in FIG. 4. FIG. 5 shows photos of doughnut beams of different wavelengths produced by a broadband VVW. Photos were taken for Ar$^+$ laser lines (458 nm, 488 nm, 514 nm), for a diode pumped solid state laser (532 nm), and a He—Ne (633 nm) laser beam. Photos were taken from the screen at 1 meter distance from the VVW, expanding the beams at the output of the WW by a concave lens of -20 mm focal length. The actual photos are reduced to black and white with 100% contrast to avoid grey scale.

Although the present invention has been described above by way of a preferred embodiment, this embodiment can be modified at will, within the scope of the appended claims, without departing from the spirit and nature of the subject invention.

What is claimed is:

1. A photoalignment method for fabrication of liquid crystal vector vortex waveplates comprising:
    (a) a substrate;
    (b) rotating said substrate;
    (c) a material layer with reversible photoaligning capability coated over the surface of said substrate;
    (d) a light source with wavelength in the absorption band of said photoalignment material;
    (e) polarizing and projecting the energy of said light source over the layer of said photalignment material on said rotating substrate; and
    (f) shaping the beam of said light source in the form of a strip with its energy redistributed from the center of the beam of said light source to its peripheries.

2. The method as in claim 1 wherein said photoalignment material comprises azobenzene units as photoresponsive core in its molecular structure.

3. The method as in claim 1 wherein redistributing the energy of said light beam from the beam center to peripheries comprises a vector vortex waveplate.

4. A method for producing a liquid crystal vector vortex waveplate wherein the substrate obtained according to claim 1 is further coated with a liquid crystal monomer precursor followed by curing.

5. The method as in claim 4 wherein said liquid crystal monomer precursor contains chiral dopants.

6. The method as in claim 5 wherein a second liquid crystal monomer precursor is dispensed and cured on the first one, the second liquid crystal monomer precursor containing a chiral dopant with chirality sign opposite to that of the first layer.

7. The method as in claim 1 wherein said substrate is chosen among the class of materials used for lens fabrication including glass, or other optically transparent material.

* * * * *

UNITED STATES PATENT AND TRADEMARK OFFICE
CERTIFICATE OF CORRECTION

PATENT NO. : 10,107,945 B2
APPLICATION NO. : 14/193027
DATED : October 23, 2018
INVENTOR(S) : Nelson Tabirian and Sarik Nersisyan It is certified that error appears in the above-identified patent and that said Letters Patent is hereby corrected as shown below:

In the Specification

Column 1, after the Title, the following should be included:
GOVERNMENT LICENSE RIGHTS
The invention was made with Government support under Contract No. NNX11CF39P. The government has certain rights in the invention.

Signed and Sealed this
Eighth Day of January, 2019

Andrei Iancu
*Director of the United States Patent and Trademark Office*